United States Patent
Wu et al.

(10) Patent No.: US 11,117,822 B2
(45) Date of Patent: Sep. 14, 2021

(54) METHOD FOR SIMULTANEOUS REMOVAL OF HEAVY METALS AND ORGANIC MATTERS FROM WASTEWATER

(71) Applicant: TONGJI UNIVERSITY, Shanghai (CN)

(72) Inventors: Deli Wu, Shanghai (CN); Yang Zong, Shanghai (CN); Zeyuan Tian, Shanghai (CN); Yalei Zhang, Shanghai (CN); Luming Ma, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 98 days.

(21) Appl. No.: 16/594,427

(22) Filed: Oct. 7, 2019

(65) Prior Publication Data

US 2020/0048129 A1    Feb. 13, 2020

Related U.S. Application Data

(63) Continuation of application No. PCT/CN2017/111276, filed on Nov. 16, 2017.

(30) Foreign Application Priority Data

Apr. 5, 2017  (CN) .......................... 201710216650.3
Jul. 12, 2017  (CN) .......................... 201710565332.8

(51) Int. Cl.
*C02F 9/00*     (2006.01)
*C02F 1/48*     (2006.01)
(Continued)

(52) U.S. Cl.
CPC ................. *C02F 9/00* (2013.01); *C02F 1/48* (2013.01); *C02F 1/52* (2013.01); *C02F 1/66* (2013.01);
(Continued)

(58) Field of Classification Search
CPC ........................................................ C02F 9/00
See application file for complete search history.

(56) References Cited

U.S. PATENT DOCUMENTS

| 3,960,723 A | 6/1976 | Butler |
| 2013/0099153 A1 | 4/2013 | Kim et al. |
| 2013/0256224 A1* | 10/2013 | Zhang ....................... C02F 9/00 210/620 |

FOREIGN PATENT DOCUMENTS

| CN | 102583689 A | 7/2012 |
| CN | 103224308 B | 8/2014 |

(Continued)

OTHER PUBLICATIONS

International Search Report (English and Chinese) and Written Opinion issued in PCT/CN2017/111276, dated Feb. 23, 2018; 12 pages provided.

*Primary Examiner* — Peter Keyworth
(74) *Attorney, Agent, or Firm* — Hamre, Schumann, Mueller & Larson, P.C.

(57) ABSTRACT

The present invention relates to a method for simultaneous removal of heavy metals and organic matters from wastewater, including four steps: anoxic reaction, incubation reaction, aerobic reaction and sedimentation reaction, to solve tricky problems and shortcomings of current treatment technologies for industrial wastewater containing both heavy metals and organic substances. Compared with current technologies, in the present invention, by regulating and controlling heavy metal ions in wastewater, catalysts with function of activating molecular oxygen are in-situ generated, catalyzing dioxygen to produce strong oxidative species, thereby realizing catalytic oxidation of organic pollutants and crystallization and precipitation removal of heavy metals, which creatively treats waste using waste to achieve green oxidation, shortened treatment process, improvement (Continued)

of treating efficiency, reduction of economic cost and promotion of technology for industrial application.

9 Claims, 1 Drawing Sheet

(51) Int. Cl.
*C02F 1/52* (2006.01)
*C02F 1/66* (2006.01)
*C02F 1/72* (2006.01)
*C02F 1/74* (2006.01)
*C02F 1/00* (2006.01)
*C02F 101/20* (2006.01)
*C02F 101/30* (2006.01)

(52) U.S. Cl.
CPC ............... *C02F 1/725* (2013.01); *C02F 1/74* (2013.01); *C02F 2001/007* (2013.01); *C02F 2001/5218* (2013.01); *C02F 2101/20* (2013.01); *C02F 2101/30* (2013.01); *C02F 2305/023* (2013.01)

(56) References Cited

FOREIGN PATENT DOCUMENTS

| CN | 104941585 A | 9/2015 |
| CN | 105016532 A | 11/2015 |
| CN | 106927547 A | 7/2017 |
| CN | 107324587 A | 11/2017 |
| JP | S5811096 A | 1/1983 |
| JP | S60168588 A | 9/1985 |

\* cited by examiner

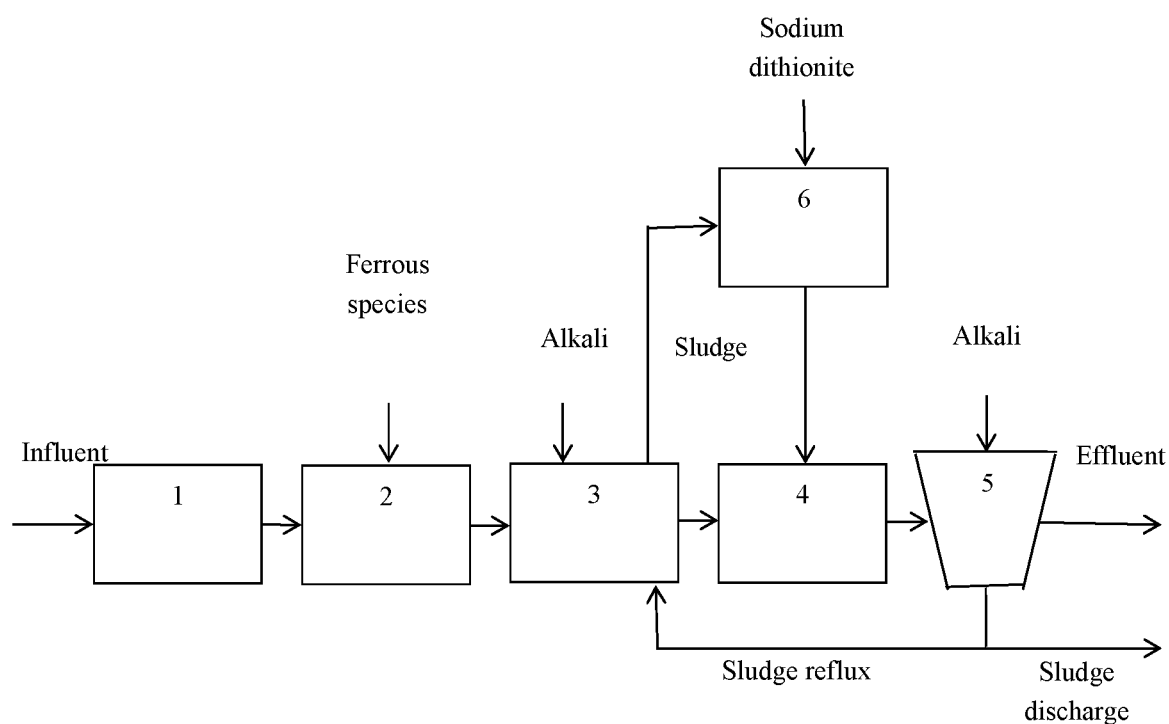

METHOD FOR SIMULTANEOUS REMOVAL OF HEAVY METALS AND ORGANIC MATTERS FROM WASTEWATER

TECHNICAL FIELD

The present invention relates generally to the field of industrial wastewater treatment and more specifically, to a treatment method for simultaneously removing heavy metals and organic matters from wastewater.

BACKGROUND TECHNOLOGIES

Heavy metals and organic pollutants coexist in industrial wastewater from electroplating, metal smelting, tannery, textile production, printing, dyeing, paper making, and other industries.

For wastewater containing heavy metals and organic matters, traditional treatment is a step-by-step method, which removes heavy metals and organic matters separately. Heavy metals are removed by chemical static precipitation or physical adsorption. And for organic matter removal, wastewater with suitable B/C is treated using traditional activated sludge or biofilm method, while advanced oxidation process is used for industrial wastewater which is difficult to be biochemically treated. In addition, the methods for simultaneous removal of heavy metals and organic matters include adsorption, membrane separation, photocatalysis, and ferric oxide coagulation. Activated carbon, bentonite, diatomite, chitosan, and other adsorbents are used to remove various pollutants in the adsorption process, and the adsorption capacity of heavy metals and organic compounds can be improved further by modification. Membrane separation removes pollutants by pressure difference and potential difference, with neutralization and micelle strengthening can be adopted when the membrane pore size is too large to intercept organic pollutants. However, adsorption and membrane separation methods have the problems of limited adsorption removal capacity, periodic cleaning and replacement of membranes. The photocatalytic system of titanium dioxide is capable of simultaneously removing organics as electron donors and heavy metals as electron acceptors via electron-hole pairs, but with the defects of high cost and poor stability, which makes it difficult to be applied for large-scale engineering applications.

Iron-based materials have been used to remove various pollutants, including organic matters and heavy metals, due to its coagulation, adsorption, catalysis, redox, and other properties. However, to remove organic pollutants in wastewater, iron-based materials often are used coupling with the addition of oxidants, such as hydrogen peroxide, persulfate, ferrate, etc., consequently increasing treatment cost.

Molecular oxygen existing in the air, with advantages of low cost, abundance, and no secondary pollution, is considered to be a green and environmental-friendly oxidant. Oxygen is not capable of oxidizing organic pollutants due to the spin forbidden against them, but able to produce reactive species through catalytic activation of oxygen itself, such as $O_2.^-$, $H_2O_2$, $.OH$, etc., for oxidative degradation of organic pollutants. However, the present molecular oxygen activation technology is usually performed by preparing complex metal catalysts, which are expensive and difficult to be used in practice. Thus developing molecular oxygen activation technology suitable for engineering application is of great importance.

CN103224308B, a Chinese patent, disclosed the process of synergistic enhancement of ferrous reduction and catalytic oxidation for wastewater biological treatment which is suitable for the treatment of refractory industrial wastewater, including the preparation of structural ferrous complexes, reduction treatment, catalytic oxidation treatment and biological treatment, so as to improve the biodegradability of wastewater and to couple biological treatment process, realizing wastewater treatment subsequently. Firstly, different from the above-mentioned patent, in which structural ferrous complexes are prepared ex-situ as catalysts, while in this application, intrinsic transition metals in wastewater are thoroughly contacted with additional ferrous salt, to in-situ generate combined FeM catalysts, achieving the treatment of waste using waste and reducing cost. Secondly, the above-mentioned patent utilizes $H_2O_2$ as oxidant, while the present invention uses easy-obtained and low-cost molecular oxygen as oxidant, which belongs to green oxidation process. At the same time, this invention creatively designs an incubation pool, providing a promising site for the stabilization of catalysts and realizing super homogeneous precipitation, which greatly improves catalysts reactivity and reaction performance.

CONTENT OF INVENTION

The aims of this invention are to solve problems and shortcomings existing in current technologies for treatment of industrial wastewater containing heavy metals and organic matters, and to provide a new method for simultaneously removing heavy metals and organic matters. By regulating and controlling heavy metal ions in wastewater, catalyst with function of activating molecular oxygen are in-situ generated, catalyzing dioxygen to produce strong oxidative species, thereby realizing catalytic oxidation of organic pollutants and crystallization and precipitation removal of heavy metals simultaneously, which creatively treats waste using waste to achieve green oxidation, shorten treatment process, improve treating efficiency, reduce economic cost and promote industrial application of technology.

The objects of this invention can be achieved by the following technical scheme:

A method for simultaneous removal of heavy metals and organic matters from wastewater is described in the following steps:

(1) Anoxic reaction: Adding a ferrous species into an industrial wastewater containing a heavy metal ion and an organic matter and then entering the industrial wastewater into an anoxic reactor, followed by controlling a dissolved oxygen concentration of the industrial wastewater to below 1.0 mg/L, adjusting its pH to 7.0, and reacting for 10-30 min, to in-situ produce a highly-active FeM catalyst.

(2) Incubation reaction: After completion of the anoxic reaction, a supernatant and a sludge containing a FeM catalyst are obtained; entering the supernatant into an aerobic tank; entering the sludge into an incubator, followed by adding sodium dithionite and mixing slowly for 60 minutes to age the catalyst for stabilization.

(3) Aerobic Reaction: The stabilized catalyst enters aerobic tank, in which the catalyst reacts for 30-120 min with aeration of 2-5 L/(min·L wastewater). The highly active catalyst produced in incubator is utilized to activate molecular oxygen in wastewater, producing strong oxidizing species, hydroxyl radicals, to oxidize and remove organic matters. Aeration is performed using air or pure oxygen.

(4) Sedimentation reaction: Wastewater of the aerobic tank enters a secondary sedimentation tank after completion of the aerobic reaction, with pH adjusted to 8.0, static settling for 30-60 min. Partial sludge from secondary sedimentation tank is refluxed to the anoxic reactor, with a reflux ratio of 2-5%, thereby realizing the enrichment of the catalyst and inducing the formation of the catalyst in anoxic reactor. Heavy metals concentration and COD in the effluent of secondary sedimentation tank are analyzed.

The above-mentioned industrial wastewater is the wastewater that contains one or more heavy metals of Cu, Ag, Co, Ni, Pd, Cr, and Mn.

The above-mentioned ferrous species are selected from one or more of $FeSO_4.7H_2O$, $FeSO_4$, and $FeCl_2$.

The ratio of Fe molar concentration in the above-mentioned ferrous species to that of all heavy metals in wastewater is above 2:1.

The ratio of Fe mass concentration in the above-mentioned ferrous species to that of COD in wastewater is above 3:1.

The dosage of above-mentioned sodium dithionite is 10-100 mg/L.

In this invention, additional Fe(II) and heavy metals in wastewater in-situ generate FeM catalysts. With the isolation of oxygen, structural ferrous exerts reaction properties of adsorption, reduction and so forth. In the course of reduction, heavy metal ions transform into transitional intermediate substances, such as $Cu_2O$, $Cu^0$, $Ag^0$, $Pd^0$, $Ni^0$, etc. On the one hand, these low-valent new-born metal catalysts themselves have high catalytic activity; on the other hand, various micro- and nano-particles of new-born metals adhering to the surface of ferrous complex are capable of catalyzing ferrous complex, further enhancing the reduction ability of ferrous complex, thus forming a highly active FeM complex to activate molecular oxygen. By introducing air and oxygen into wastewater, catalysts react with molecular oxygen to produce reactive oxygen species, such as $O_2.^-$, $H_2O_2$, OH, etc., which are able to degrade organic pollutants. Finally, heavy metal ions released due to oxidation by oxygen are removed by alkali precipitation.

Taking Cu ion as an example, the reaction equation for low-valent new-born Cu catalysts producing reactive oxygen species could be expressed as follows:

$$2Cu+O_2+2H_2O \rightarrow 2Cu(I)+H_2O_2+2OH^-$$

$$Cu+O_2+2H_2O \rightarrow Cu(II)+H_2O_2+2OH^-$$

$$Cu(I)+H^++H_2O_2 \rightarrow Cu(II)+.OH+H_2O$$

$$Cu(II)+H_2O_2 \rightarrow Cu(I)+.O_2^-+2H^+$$

In the reaction process, anoxic conditions are conducive to the formation of catalysts, and the reduction capacity of catalysts is fully guaranteed, while the aerobic tank provides sufficient oxygen as oxidant to degrade organic pollutants by aeration. The suspension layer in the incubator is mixed to form supersaturated solution, and the supersaturated solution undergoes super-precipitation to prevent the local heterogeneity in precipitator, thus improving the catalytic activity of catalysts. By dosing sodium dithionite, not only the stabilization and removal of heavy metals can be improved, but also the performance of molecular oxygen activation by catalysts.

Compared with existing technologies, this invention possesses the following advantages:

(1) Realizing the simultaneous removal of heavy metals and organic matters in wastewater, with simple treatment process and high efficiency. Also realizing comprehensive use of wastes, reducing dosage of chemicals, achieving green and economic oxidation technology.

(2) Mild reaction conditions. Catalytic oxidation is carried out under normal temperature, pressure and neutral pH conditions.

(3) Making full use of the original heavy metal ions in wastewater to in-situ form catalysts, not only ensuring catalysts activity and improving degradation efficiency of organic matters, but also realizing waste treatment using waste, saving cost and suitable for engineering application.

(4) Using oxygen as oxidant to degrade organic pollutants, replacing $H_2O_2$, ozone, potassium permanganate, persulfate. Not only cheap and abundant, but green and non-pollution.

(5) The innovative design of incubator realizes high density and super-homogeneous reaction of catalysts sludge, beneficial to the stability of catalysts and improvement of reaction activity.

(6) The reflux of sludge containing FeM can enrich catalysts and ensure the content and quality of catalysts in the system.

(7) When the wastewater contains high concentration of Fe, pH can be adjusted by adding alkali solution directly, in-situ generating heavy metals catalytic system for treatment, thereby saving Fe (II) dosage.

ATTACHED FIGURE FOR ILLUSTRATION

FIG. 1 represents the process flow chart of this invention.
In this figure, 1-primary sedimentation tank, 2-adjusting tank, 3-anoxic reactor, 4-aerobic reactor, 5-secondary sedimentation tank, 6-incubation pool.

SPECIFIC IMPLEMENTING OPERATION

The present invention is described in detail below combined with specific examples. The following practical examples will help those skilled in the art to further understand this invention, but will not restrict this invention in any form. It should be pointed out that for common technicians in the art, a certain amount of variations and modifications can be made under prerequisite of not departing from the concept of this invention, which belongs to the scope of protection of this invention.

PRACTICAL EXAMPLE 1

Sampling a certain electroplating wastewater, pH=6.3, initial concentration and removal efficiency of pollutants in water sample are shown in Table 1.

(1) Anoxic reaction: Sampling 1 L of the industrial wastewater, adding 2.78 g $FeSO_4.7H_2O$, leading to Fe molar concentration=10 mmol/L. The sum of molar concentration of heavy metal ions(M) in wastewater is 4.0 mmol/L, which makes molar ratio of Fe to M equal to 2.5:1, consistent with the technical characteristic of above 2:1. Wastewater COD is 120 mg/L, then the ratio of Fe mass concentration to COD equals to 4.7:1, consistent with the technical characteristic of above 3:1. Adding adjusted wastewater into anoxic reactor, with dissolved oxygen concentration controlled at less than 1.0 mg/L, pH adjusted to 7.0, reaction time kept for 10 min, to in-situ generate highly active FeM catalysts.

(2) Incubation reaction: The supernatant enters the aerobic reaction pool after the end of anoxic reaction, while the sludge containing FeM catalysts enters into incubator, followed by the addition of 30 mg/L sodium dithionite, mixed slowly for 60 minutes to stabilize the aging of catalysts.

(3) Aerobic Reaction: The stabilized catalysts enter aerobic tank, in which the catalysts react for 120 min with aeration of 2 L/(min·L wastewater). The highly active catalysts produced in incubator are utilized to activate molecular oxygen in wastewater, producing strong oxidizing species, hydroxyl radicals, to oxidize and remove organic matters.

(4) Sedimentation reaction: Wastewater enters secondary sedimentation tank after aerobic reaction, with pH adjusted to above 8.0, static settling for 30 min. Partial sludge from secondary sedimentation tank is refluxed to anoxic reactor, with reflux ratio of 5%, thereby realizing the enrichment of catalysts and inducing the formation of catalysts in anoxic reactor. Heavy metals concentration and COD in the effluent of secondary sedimentation tank are analyzed.

TABLE 1

Removal efficiency of heavy metals and organic matters by FeM catalysts

| Pollutants | Ag | Cu | Pb | COD |
|---|---|---|---|---|
| Initial Conc.(mg/L) | 5.23 | 238 | 32 | 120 |
| Removal rate(%) | 100 | 100 | 100 | 75 |

PRACTICAL EXAMPLE 2

Sampling a certain electroplating wastewater, pH=2.1, initial concentration and removal efficiency of pollutants in water sample are shown in Table 2.

(1) Anoxic reaction: Sampling 1 L of the industrial wastewater, adding 3.34 g $FeSO_4 \cdot 7H_2O$, leading to Fe molar concentration=12 mmol/L. The sum of molar concentration of heavy metal ions(M) in wastewater is 4.7 mmol/L, which makes molar ratio of Fe to M equal to 2.5:1, consistent with the technical characteristic of above 2:1. Wastewater COD is 60 mg/L, then the ratio of Fe mass concentration to COD equals to 11.2:1, consistent with the technical characteristic of above 3:1. Adding adjusted wastewater into anoxic reactor, with dissolved oxygen concentration controlled at less than 1.0 mg/L, pH adjusted to 7.0, reaction time kept for 20 min, to in-situ generate highly active FeM catalysts.

(2) Incubation reaction: The supernatant enters the aerobic reaction pool after the end of anoxic reaction, while the sludge containing FeM catalysts enters into incubator, followed by the addition of 20 mg/L sodium dithionite, mixed slowly for 60 minutes to stabilize the aging of catalysts.

(3) Aerobic Reaction: The stabilized catalysts enter aerobic tank, in which the catalysts react for 120 min with aeration of 2 L/(min·L wastewater). The highly active catalysts produced in incubator are utilized to activate molecular oxygen in wastewater, producing strong oxidizing species, hydroxyl radicals, to oxidize and remove organic matters.

(4) Sedimentation reaction: Wastewater enters secondary sedimentation tank after aerobic reaction, with pH adjusted to above 8.0, static settling for 30 min. Partial sludge from secondary sedimentation tank is refluxed to anoxic reactor, with reflux ratio of 5%, thereby realizing the enrichment of catalysts and inducing the formation of catalysts in anoxic reactor. Heavy metals concentration and COD in the effluent of secondary sedimentation tank are analyzed.

TABLE 2

Removal efficiency of heavy metals and organic matters by FeM catalysts

| Pollutants | Cu | Cr | Pd | Ni | COD |
|---|---|---|---|---|---|
| Initial concentration(mg/L) | 192 | 5.7 | 10.5 | 88 | 60 |
| Removal rate(%) | 99 | 98 | 100 | 99 | 85 |

PRACTICAL EXAMPLE 3

Sampling a certain wastewater from titanium dioxide production, pH=1.2, initial concentration and removal efficiency of pollutants in water sample are shown in Table 3.

(1) Anoxic reaction: Sampling 1 L of the industrial wastewater, on accounting that Fe mass concentration in wastewater is 3148 mg/L, which makes Fe molar concentration 12 mmol/L. The sum of molar concentration of heavy metal ions(M) in wastewater is 2.1 mmol/L, which makes molar ratio of Fe to M equal to 26.2:1, consistent with the technical characteristic of above 2:1. Wastewater COD is 447 mg/L, then the ratio of Fe mass concentration to COD equals to 7.0:1, consistent with the technical characteristic of above 3:1. Thus no more external ferrous is added into wastewater. Adding adjusted wastewater into anoxic reactor, with dissolved oxygen concentration controlled at less than 1.0 mg/L, pH adjusted to 7.0, reaction time kept for 30 min, to in-situ generate highly active FeM catalysts.

(2) Incubation reaction: The supernatant enters the aerobic reaction pool after the end of anoxic reaction, while the sludge containing FeM catalysts enters into incubator, followed by the addition of 80 mg/L sodium dithionite, mixed slowly for 60 minutes to stabilize the aging of catalysts.

(3) Aerobic Reaction: The stabilized catalysts enter aerobic tank, in which the catalysts react for 30 min with aeration of 3 L/(min·L wastewater). The highly active catalysts produced in incubator are utilized to activate molecular oxygen in wastewater, producing strong oxidizing species, hydroxyl radicals, to oxidize and remove organic matters.

(4) Sedimentation reaction: Wastewater enters secondary sedimentation tank after aerobic reaction, with pH adjusted to above 8.0, static settling for 60 min. Partial sludge from secondary sedimentation tank is refluxed to anoxic reactor, with reflux ratio of 2%, thereby realizing the enrichment of catalysts and inducing the formation of catalysts in anoxic reactor. Heavy metals concentration and COD in the effluent of secondary sedimentation tank are analyzed.

TABLE 3

Removal efficiency of heavy metals and organic matters by FeM catalysts

| Pollutants | Fe | Mn | Cr | Ni | COD |
|---|---|---|---|---|---|
| Initial concentration(mg/L) | 3148 | 115 | 2.43 | 0.42 | 447 |
| Removal rate(%) | 94 | 64 | 100 | 100 | 67 |

PRACTICAL EXAMPLE 4

Sampling a certain plating wastewater, pH=3.0, initial concentration and removal efficiency of pollutants in water sample are shown in Table 4.

(1) Anoxic reaction: Sampling 1 L of the industrial wastewater, adding 12.51 g $FeSO_4 \cdot 7H_2O$, leading to Fe molar concentration=45 mmol/L. The sum of molar concentration of heavy metal ions(M) in wastewater is 18.6 mmol/L, which makes a molar ratio of Fe to M equal to 2.4:1, consistent with the technical characteristic of above 2:1. Wastewater COD is 824 mg/L, then the ratio of Fe mass concentration to COD equals to 3.1:1, consistent with the technical characteristic of above 3:1. Adding adjusted wastewater into anoxic reactor, with dissolved oxygen concentration controlled at less than 1.0 mg/L, pH adjusted to 7.0, reaction time kept for 30 min, to in-situ generate a highly active FeM catalyst.

(2) Incubation reaction: The supernatant enters the aerobic reaction pool after the end of anoxic reaction, while the sludge containing FeM catalyst enters into incubator, followed by the addition of 100 mg/L sodium dithionite, mixed slowly for 60 minutes to stabilize the aging of catalysts.

(3) Aerobic Reaction: The stabilized catalysts enter aerobic tank, in which the catalysts react for 60 min with aeration of 5 L/(min·L wastewater). The highly active catalysts produced in incubator are utilized to activate molecular oxygen in wastewater, producing strong oxidizing species, hydroxyl radicals, to oxidize and remove organic matters.

(4) Sedimentation reaction: Wastewater enters secondary sedimentation tank after aerobic reaction, with pH adjusted to above 8.0, static settling for 60 min. Partial sludge from secondary sedimentation tank is refluxed to anoxic reactor, with reflux ratio of 4%, thereby realizing the enrichment of catalysts and inducing the formation of catalysts in anoxic reactor. Heavy metals concentration and COD in the effluent of secondary sedimentation tank are analyzed.

TABLE 4

Removal efficiency of heavy metals and organic matters by FeM catalysts

| Pollutants | Cu | Co | Ni | COD |
|---|---|---|---|---|
| Initial concentration(mg/L) | 433 | 4.20 | 692 | 824 |
| Removal rate(%) | 99 | 100 | 85 | 56 |

PRACTICAL EXAMPLE 5

Sampling a certain metallurgical Wastewater, pH=2.3, initial concentration and removal efficiency of pollutants in water sample are shown in Table 5.

(1) Anoxic reaction: Sampling 1 L of the industrial wastewater, adding 13.90 g $FeSO_4.7H_2O$, leading to Fe molar concentration=50 mmol/L. The sum of molar concentration of heavy metal ions(M) in wastewater is 22.4 mmol/L, which makes molar ratio of Fe to M equal to 2.2:1, consistent with the technical characteristic of above 2:1. Wastewater COD is 102 mg/L, then the ratio of Fe mass concentration to COD equals to 27.5:1, consistent with the technical characteristic of above 3:1. Adding adjusted wastewater into anoxic reactor, with dissolved oxygen concentration controlled at less than 1.0 mg/L, pH adjusted to 7.0, reaction time kept for 30 min, to in-situ generate highly active FeM catalysts.

(2) Incubation reaction: The supernatant enters the aerobic reaction pool after the end of anoxic reaction, while the sludge containing FeM catalysts enters into incubator, followed by the addition of 100 mg/L sodium dithionite, mixed slowly for 60 minutes to stabilize the aging of catalysts.

(3) Aerobic Reaction: The stabilized catalysts enter aerobic tank, in which the catalysts react for 60 min with aeration of 4 L/(min·L wastewater). The highly active catalysts produced in incubator are utilized to activate molecular oxygen in wastewater, producing strong oxidizing species, hydroxyl radicals, to oxidize and remove organic matters.

(4) Sedimentation reaction: Wastewater enters secondary sedimentation tank after aerobic reaction, with pH adjusted to above 8.0, static settling for 60 min. Partial sludge from secondary sedimentation tank is refluxed to anoxic reactor, with reflux ratio of 3%, thereby realizing the enrichment of catalysts and inducing the formation of catalysts in anoxic reactor. Heavy metals concentration and COD in the effluent of secondary sedimentation tank are analyzed.

TABLE 5

Removal efficiency of heavy metals and organic matters by FeM catalysts

| Pollutants | Cu | Co | Ni | COD |
|---|---|---|---|---|
| Initial concentration(mg/L) | 227 | 1106 | 1.88 | 102 |
| Removal rate(%) | 100 | 82 | 100 | 83 |

PRACTICAL EXAMPLE 6

A method for simultaneous removal of heavy metals and organic matters from wastewater, whose process is described in FIG. 1. The following steps are adopted:

(1) Anoxic reaction: Industrial wastewater containing heavy metals like Cu, Ag, Co and organic matters enters primary sedimentation tank 1 for preliminary precipitation, and then enters into regulating pool 2. Adding $FeSO_4.7H_2O$ into the above-mentioned wastewater, making a ratio of Fe molar concentration to that of all heavy metal ions(M) in wastewater equal to 3:1, ratio of Fe mass concentration to COD equals to 4:1. Afterwards the wastewater enters into anoxic reactor 3, with dissolved oxygen concentration controlled at less than 1.0 mg/L, pH adjusted to 7.0, reaction time kept for 10 min, to in-situ generate highly active FeM catalysts.

(2) Incubation reaction: The supernatant enters the aerobic reaction pool 4 after the end of reaction in anoxic reactor 3, while the sludge containing FeM catalysts enters into incubator 6, followed by the addition of 10 mg/L sodium dithionite, mixed slowly for 60 minutes to stabilize the aging of catalysts.

(3) Aerobic Reaction: The stabilized catalysts enter aerobic tank 4, in which the catalysts react for 120 min with aeration of 2 L/(min·L wastewater). The highly active catalysts produced in incubator are utilized to activate molecular oxygen in wastewater, producing strong oxidizing species, hydroxyl radicals, to oxidize and remove organic matters. Air is utilized for aeration.

(4) Sedimentation reaction: Wastewater enters secondary sedimentation tank 5 after the end of reaction in aerobic reactor 4, with pH adjusted to above 9.0, static settling for 30 min. Partial sludge from secondary sedimentation tank is refluxed to anoxic reactor, with reflux ratio of 2% and discharge of excess sludge, thereby realizing the enrichment of catalysts and inducing the formation of catalysts in anoxic reactor. Heavy metals concentration and COD in the effluent of secondary sedimentation tank 5 are analyzed.

PRACTICAL EXAMPLE 7

A method for simultaneous removal of heavy metals and organic matters from wastewater, with following steps adopted:

(1) Anoxic reaction: Adding $FeCl_2$ into industrial wastewater containing heavy metals like Pd, Cr and organic matters, making a ratio of Fe molar concentration to that of all heavy metal ions(M) in wastewater equal to 4:1, ratio of Fe mass concentration to COD equals to 5:1. Afterwards the wastewater enters into anoxic reactor, with dissolved oxygen concentration controlled at less than 1.0 mg/L, pH adjusted to 7.0, reaction time kept for 30 min, to in-situ generate highly active FeM catalysts.

(2) Incubation reaction: The supernatant enters the aerobic reaction pool after the end of reaction in anoxic reactor, while the sludge containing FeM catalysts enters into incubator, followed by the addition of 100 mg/L sodium dithionite, mixed slowly for 60 minutes to stabilize the aging of catalysts.

(3) Aerobic Reaction: The stabilized catalysts enter aerobic tank, in which the catalysts react for 30 min with aeration of 5 L/(min·L wastewater). The highly active catalysts produced in incubator are utilized to activate molecular oxygen in wastewater, producing strong oxidizing species, hydroxyl radicals, to oxidize and remove organic matters. Pure oxygen is utilized for aeration.

(4) Sedimentation reaction: Wastewater enters secondary sedimentation tank after the end of reaction in aerobic reactor, with pH adjusted to above 10.0, static settling for 60 min. Partial sludge from secondary sedimentation tank is refluxed to anoxic reactor, with reflux ratio of 5%, thereby realizing the enrichment of catalysts and inducing the formation of catalysts in anoxic reactor. Heavy metals concentration and COD in the effluent of secondary sedimentation tank are analyzed.

The specific examples of this invention are described above. It should be understood that this invention is not limited to these specific examples, and skilled technicians in the art are allowed to make variations or modifications under the scope of claims, without affecting the essence of this invention.

The invention claimed is:

1. A method for simultaneous removal of heavy metals and organic matters from wastewater, comprising:
   (1) anoxic reaction: adding ferrous species into an industrial wastewater containing heavy metal ions and organic matters, afterward adding the industrial wastewater to an anoxic tank, controlling a concentration of dissolved oxygen in the industrial wastewater to less than 1.0 mg/L, adjusting pH value to 7.0, and reacting for 10-30 minutes to in situ produce FeM catalyst;
   (2) incubation reaction: after anoxic reaction, the anoxic tank contains a supernatant and a sludge containing FeM catalyst, the supernatant enters an aerobic tank; the sludge enters an incubation pool, followed by addition of sodium dithionite, and the FeM catalyst is stabilized via aging by stirring for 60 minutes;
   (3) aerobic reaction: the stabilized catalyst enters into the aerobic tank and reacts for 30-120 min, with 2-5 L/(min·L wastewater) aeration, the stabilized catalyst generated in the incubation pool activates molecular oxygen in water, subsequently producing hydroxyl radical to oxidize the organic matter in wastewater;
   (4) sedimentation reaction: after completion of the aerobic reaction, wastewater of the aerobic tank enters a secondary sedimentation tank, and pH of the wastewater is adjusted to above 8.0, after settling for 30-60 minutes, heavy metal ions are removed from wastewater.

2. The method of claim 1, wherein the industrial wastewater contains one or more heavy metal ions of Cu, Ag, Co, Ni, Pd, Cr, and Mn.

3. The method of claim 1, wherein the ferrous species includes one or more selected from the group consisting of $FeSO_4 \cdot 7H_2O$, $FeSO_4$, and $FeCl_2$.

4. The method of claim 1, wherein a ratio of molar concentration of Fe in ferrous species to that of all metal ions in wastewater is more than 2:1.

5. The method of claim 1, wherein a ratio of mass concentration of Fe in ferrous species to that of chemical oxygen demand (COD) in wastewater is more than 3:1.

6. The method of claim 1, wherein a dosage of sodium dithionite is 10-100 mg/L.

7. The method of claim 1, wherein a proportion of the sludge in the secondary sedimentation tank is refluxed to the anoxic tank, by which the catalyst is enriched and the formation of the catalyst is induced.

8. The method of claim 7, wherein the proportion is 2-5%.

9. A method for simultaneous removal of heavy metals and organic matters from wastewater, comprising:
   (1) anoxic reaction: adding a ferrous species into industrial wastewater containing heavy metal ion and organic matter; afterward adding the industrial wastewater to an anoxic tank, controlling the concentration of dissolved oxygen in the industrial wastewater to less than 1.0 mg/L, adjusting pH value to 7.0; according to the concentration of $CO_3^{2-}$ in the industrial wastewater, adding 2 mol/L $Na_2CO_3$ solution to make the $CO_3^{2-}$ concentration in the industrial wastewater greater than 500 mg/L; adding 2 g/L $Fe_3O_4$ nanoparticles as magnetic species; and reacting for 10-30 minutes to in situ produce a FeM catalyst;
   (2) incubation reaction: after anoxic reaction, the anoxic tank contains a supernatant and a sludge containing FeM catalyst; the supernatant enters an aerobic tank; the sludge containing the FeM catalyst enters an incubation pool, followed by addition of sodium dithionite, and the FeM catalyst is stabilized via aging by stirring for 60 minutes;
   (3) aerobic reaction: the stabilized catalyst enters into the aerobic tank and react for 30-120 min, with 2-5 L/(min·L wastewater) aeration, the stabilized catalyst activates molecular oxygen in water, subsequently producing hydroxyl radicals to oxidize organic matter in the supernatant;
   (4) magnetic separation reaction: after completion of the aerobic reaction, entering wastewater of the aerobic tank to a magnetic separation reactor, adjusting the pH of the wastewater to above 8.0, and controlling a magnetic field strength to be 500-2000 G to achieve solid-liquid separation and remove heavy metal ions in the water; returning a portion of the sludge to the anoxic tank; and separating and reusing the magnetic species.

* * * * *